Feb. 3, 1953  N. MARCHAND  2,627,267
MULTIPLE-LEAD ELECTROCARDIOGRAPHS
Filed July 22, 1947  5 Sheets-Sheet 1

Fig. 1

INVENTOR.
Nathan Marchand
BY
Harry Cole
ATTORNEY

Feb. 3, 1953

N. MARCHAND

2,627,267

MULTIPLE-LEAD ELECTROCARDIOGRAPHS

Filed July 22, 1947

INVENTOR.
Nathan Marchand
BY
Harry Cohen
ATTORNEY

Feb. 3, 1953 N. MARCHAND 2,627,267
MULTIPLE-LEAD ELECTROCARDIOGRAPHS
Filed July 22, 1947 5 Sheets-Sheet 4

INVENTOR.
Nathan Marchand
BY
Harry Cohen
ATTORNEY

Patented Feb. 3, 1953

2,627,267

UNITED STATES PATENT OFFICE 2,627,267

MULTIPLE-LEAD ELECTROCARDIOGRAPHS

Nathan Marchand, New York, N. Y., assignor, by mesne assignments, to Technicon Cardiograph Corporation, New York, N. Y.

Application July 22, 1947, Serial No. 762,633

27 Claims. (Cl. 128—2.06)

The present invention relates to electro-cardiographs and to electrical and electronic circuits therefor.

The primary object of this invention is to provide a multiple lead electro-cardiograph operable to produce simultaneously and directly on a record web or sheet a plurality of graphs or traces of body voltage variations transmitted from the subject by the several leads, respectively, and to produce said graphs or traces on the web or record sheet in such manner that they all have an identical time relation with respect to each other. For example, in accordance with this invention, the left arm-right arm voltage variations, the right arm-left leg voltage variations, the left arm-left leg voltage variations are all recorded simultaneously on the record sheet in the same time relation so that the physician, cardiologist, or diagnostician can obtain not only the information as revealed by said three different voltage variations considered separately but also as revealed by said three voltage variations considered in their correlated aspects at any instant of time along a common time coordinate of the three cardiograms. In this connection, it will be understood that even when cardiograms corresponding to different leads are obtained in immediate succession, the cardiologist cannot be certain that the condition of the subject's heart had not changed in the time intervals between the taking of the several cardiograms, even if such intervals are very short. Hence, he is not able to correlate the information revealed by the three different lead cardiograms, with the same degree of certainty of correct analysis which is possible when the several cardiograms are obtained at the same time in accordance with the present invention.

Another object of the invention is to provide for amplifying simultaneously the minute body voltages of the several leads, respectively, in such manner that the same lead may be connected to a plurality of separate amplifiers in different channels without causing interaction between different channels or affecting amplitude. More specifically, in accordance with the present invention, there is provided a plurality of separate amplifier channels for the voltage variations across the several different pairs of companion parts, respectively, of the body, but the same lead, for example, the left arm lead in the above mentioned combination of leads, may be connected to different channels at the same time without affecting the other channels.

Various other objects as well as objects ancillary or complementary to the above mentioned objects will be noted as the description of the invention proceeds with reference to the accompanying drawings.

Heretofore, it was the practice to take one cardiogram at a time by connecting an electrocardiograph to a single pair of electrodes applied to two different parts of the subject's body, for example to the left arm and right arm, or to the right arm and left leg, or to the left arm and left leg, or to a precordial point and one of the arms or left leg of the subject. Ordinarily a group of cardiograms are taken, the group, however, being made up of out-of-phase cardiograms taken by connecting the cardiograph necessarily at different times to said different pairs, respectively, of different parts of the subject's body. Cardiograms thus taken at different times are not necessarily indicative of the same condition of the heart, even if the interval of time which must necessarily elapse between the taking of the cardiograms is very short, since under such circumstances the cardiologist cannot be sure that the condition of the patient's heart was the same during the successive periods of time required to obtain the several cardiograms. Moreover, in thus taking the cardiograms at different times, even with very short intervening periods of time, the several cardiograms are not related to a common time coordinate. For this latter reason, even if it is assumed (as it necessarily must be) that there has been no change in the patient's condition, it is very difficult, if not impossible, even for a highly skilled and competent cardiologist to interpret and correlate accurately and properly the information available from a study of the out-of-phase cardiograms. These serious objections and disadvantages are overcome by the present invention. The preferred mode of accomplishing this important result according to the present invention will now be described.

Figure 1:
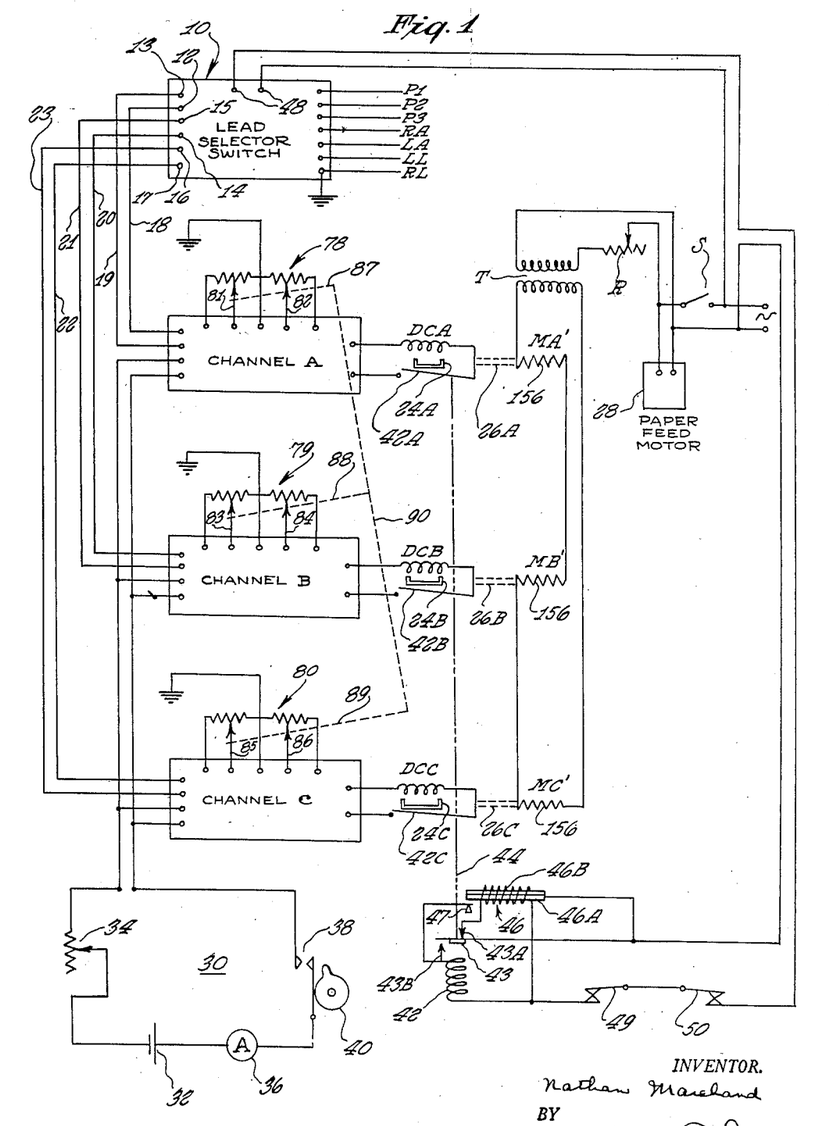
Fig. 1 is a schematic illustration of an electrocardiograph embodying the present invention, the marking elements of the recorder being indicated at MA, MB and MC.

As shown more or less schematically in Fig. 1, the electro-cardiograph of the present invention comprises a lead selector switch 10 having a plurality of input terminals designated P1, P2, P3, RA, LA, LL, RL, adapted to be connected by suitable conductors and companion electrodes (not shown) to different parts, respectively, of the subject whose heart condition is to be investigated. The terminal RL is to be connected to the right leg of the subject and is grounded as shown. The terminals RA, LA, and LL are the extremity terminals for connection, respectively, to the subject's right arm, left arm and left leg, in accordance with known principles of cardiology. The terminals P1, P2 and P3 are the precordial terminals. As will hereinafter more specifically appear, three leads are connected by movable contact members to three selected input terminals of the switch. The movable contact members are connected in pairs to the three pairs of output terminals 12—13, 14—15, and 16—17, of the switch. For example, in one setting of the switch 10, the RA and LA leads are connected to terminals 12 and 13, respectively, the LL and RA leads are connected to the terminals 14 and 15, respectively, and the leads LL and LA are connected to the treminals 16 and 17, respectively. In other settings of the switch, the three leads are connected to different input terminals of the switch, as will be later explained.

The three leads, thus connected to the selected input terminals are connected by means of the conductors 18—19, 20—21, and 22—23, respectively, to three different channels A, B, and C, respectively. Each of said channels includes electronic amplifying means for amplifying the body voltages transmitted to said channels by said three leads from across three pairs of different parts of the subject's body. The electrical circuits of these channels are all alike, one of these circuits, subsequently described herein, being shown in Fig. 3 as illustrative of the electrical circuit of each channel, there being three such circuits, one for each channel.

The output terminals of said channels are connected to the driving coils DCA, DCB, and DCC, respectively, of the magneto-motive devices which are provided in the apparatus for operating the recorder. These magneto-motive devices include a strong permanent magnet shown schematically in Fig. 1 as three permanent magnets 24A, 24B, and 24C. The driving coils are mechanically connected individually to the pens or marking elements MA, MB and MC which operate on the recording material to record the voltage variations supplied to said channels and amplified by the amplifying means provided therein as hereinbefore indicated. The recording material is preferably, but not necessarily, chemically treated paper of a known type and when such paper is used the pens or marking elements are electrically heated. It will be understood that the resistance for the heating means may be the resistance of the conducting strips, hereinafter described, incorporated in the marking elements, as indicated by the resistances designated by the reference characters MA', MB', and MC', or separate resistance elements may be used. As will be readily understood the paper is affected by the heat of said elements whereby visual records are produced directly on a length of said paper during the movement of the latter in the direction of its length. The connections of the driving coils to the companion marking elements are indicated schematically in Fig. 1 by the dotted lines 26A, 26B and 26C. The corresponding mechanisms will be described subsequently in detail. As indicated, a synchronous motor 28 is provided for moving the recording material or paper at uniform speed in the direction of its length. The motor is preferably energized by 60 cycle alternating current at 110 volts, and a step-down transformer T is provided for supplying heating current to the resistances of the marking elements or pens MA, MB, and MC. An adjustable resistance R is provided in the primary circuit of the transformer for regulating the heat of said marking elements.

Figure 2:
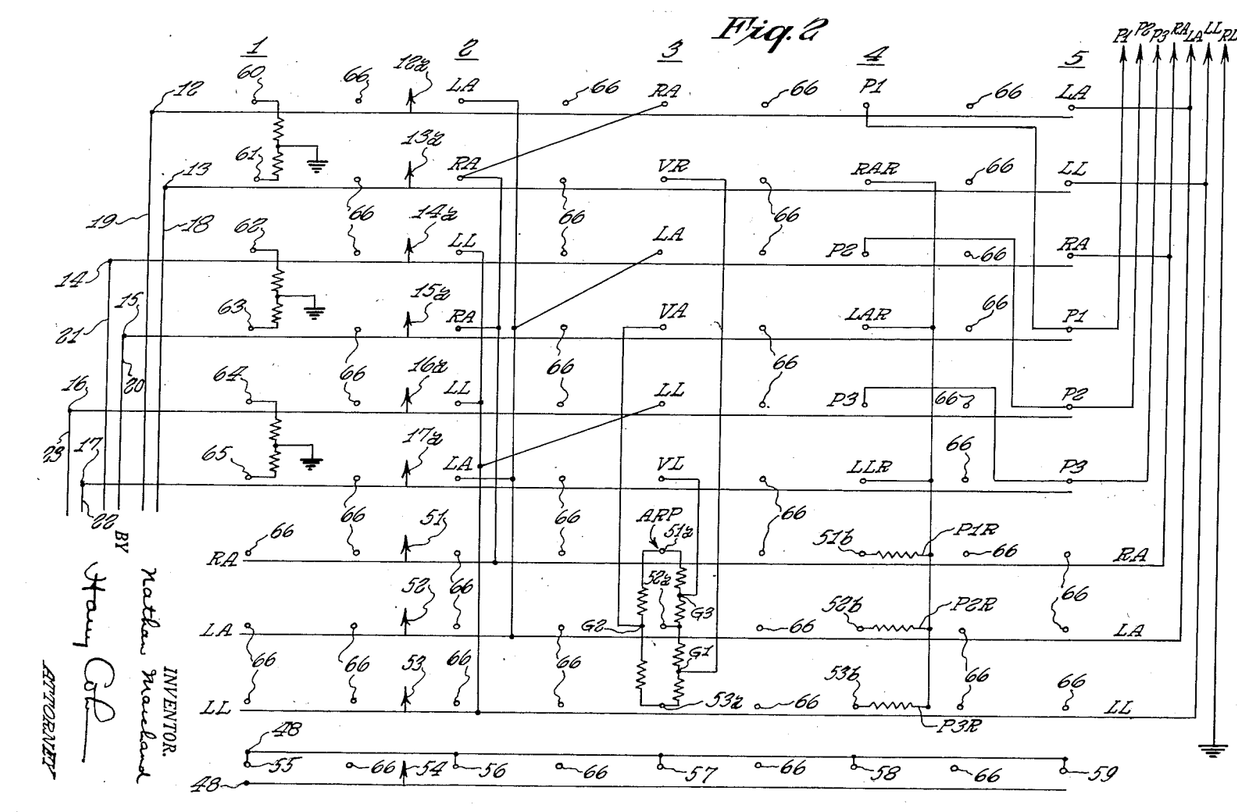
Fig. 2 is a diagrammatic illustration of the control or selector switch and its circuit.

Provision is made for supplying standardization voltage impulses to the three channels. For this purpose, the circuit 30 is connected to each of said channels, suitable reversing switches being provided as shown in Fig. 2 and later described. Circuit 30 includes a battery 32, as the source of voltage, a variable resistance 34, an ammeter 36, and a normally open pulse switch 38 which is periodically closed by a rotary pulse wheel 40 actuated at the proper speed in any suitable way, as by a clock motor (not shown). Ordinarily the standardization voltage is of the order of one millivolt. It will be noted that the standardization pulses are superimposed upon the several cardiograms, respectively, during the operation of the apparatus while the leads are connected to the patient or subject.

Provision is made for stabilizing the action of the amplifiers in the channels before operating the marking elements MA, MB and MC of the recorder. For this purpose there is provided a time delay relay which includes an electro-magnet the winding of which is indicated at 42. Movable switch contacts 42A, 42B and 42C are closed by the movable core 44 of the electro-magnet when the latter is energized and are opened when it is de-energized. A thermostatically controlled switch 46 having a suitable time lag in closing is provided in the circuit of winding 42 and it will be noted that the lead selector switch 10 is provided with terminals 48 which are connected in said circuit so that, as hereinafter described, the energization of relay winding 42 is under the master control of switch 10. The operation of switch 10 is such that winding 42 is de-energized and contacts 42A, 42B and 42C therefore open, whenever switch 10 is actuated to change the combinotion of leads which are connected to the channels, and do not close until the thermostatically controlled time-delay switch 46 closes. Thus the marking elements or pens MA, MB and MC are prevented from operating until the action of the amplifiers in the several channels becomes stable.

The circuit of winding 42 also includes the normally closed switches 49 and 59 which are in series circuit relation with each other and with said winding. These switches are opened in the event of over excursion of any one of the marking elements in either direction laterally of the web of recording material. The preferred mechanism for accomplishing this result is hereinafter explained with reference to the illustration thereof in Figs. 4 and 5 of the drawing. It will be noted that if either of switches 49 and 50 opens, winding 42 is de-energized and contacts 42A, 42B, and 42C open so that all of the driving coils for the marking elements are simultaneously de-energized thus stopping the motions of the marking elements. When either switch 49 or 50 closes after it is opened by over-excursion of any one of the marking elements, the winding remains de-energized and contacts 42A, 42B and 42C consequently remain open until the time delay switch 46 operates to close the circuit of said winding, thus affording the amplifiers in channels A, B and C time for resuming their stable action.

The selector switch 10, which may be of any suitable mechanical construction, is illustrated diagrammatically in Fig. 2. The movable switch contacts are indicated at 12A—13A, connected to terminals 12—13 for channel A; at 14A—15A, connected to terminals 14—15 for channel B; at 16A—17A, connected to terminals 16—17 for channel C. Additional movable contacts are indicated at 51, 52 and 53 and are connected to the RA, LA, and LL terminals. The movable contact indicated at 54 is connected to one of the terminals 48, the other terminal 48 being connected to the spaced stationary contacts 55, 56, 57, 58 and 59. For convenience it may be assumed that all of the foregoing movable contacts move rectilinearly, and it will be understood that they are mechanically connected for movement in unison to and from each of the several stations 1, 2, 3, 4, and 5. Station 1 is the pre-lead test station having stationary contacts 60—61, 62—63, and 64—65 as the end terminals of the resistances shown. Each of said resistances has a mid-tap which is connected to ground as shown. These resistances are substitutes for resistances which are present when the leads are connected to the subject and are provided so that the apparatus may be tested before the leads are connected to the subject.

At station 2, the movable contacts for the three channels are connected to the LA—RA, LL—RA, and LL—LA terminals.

At station 3, the movable contacts for the three channels are connected to the three leads for the augmented extremity potentials known and designated in cardiology as aVR, aVL, and aVF. One stationary contact for each of the leads for augmented extremity potential consists of one of the RA, LA and LL terminals, as indicated, and the companion stationary contacts for the three channels are indicated at VR, VA and VL, respectively. The stationary contacts RA, LA and LL at station 3 are connected to the corresponding terminals by the movable contacts 51, 52 and 53 and the companion stationary contacts 51A, 52A and 53A representing fixed points provided in the closed loop ARP which includes the resistances shown for obtaining the augmented extremity potential. The stationary contacts VR, VA and VL are connected directly to fixed points or central terminals, respectively, on said loop as indicated at G1, G2, and G3, respectively. Thus, at station 3 the voltages between the right arm and a central terminal between the left arm and the left leg are transmitted over channel 1 to the companion recording element. Said central terminal is obtained by a center tapped resistance which is placed between the other two extremities, the central terminal being the center tap indicated at G1. At the same time the voltages between the left arm and a central terminal between the other two extremities (right arm and left leg) are transmitted over channel 2 to the companion recording element of the recording apparatus, said central terminal being also obtained by a center tap resistor, the central terminal being the center tap indicated at G2. Also, at the same time the voltages between the left leg and a central terminal between the two other extremities (right arm and left arm) are transmitted over channel 3, said central terminal being provided by a center tapped resistor, the central terminal being the center tap indicated at G3. Thus, the three augmented extremity potentials are transmitted simultaneously to the three channels, respectively, when the movable switch contacts are at station 3 so that said potentials can be recorded simultaneously by the corresponding marking elements on the recording web in the same time relation. It will be noted that the resistances connected as shown in the closed loop provide central terminals for connection from RA, LA and LL, respectively, and at the same time the effect of the resistance in each connection from RA, LA and LL to its associated central terminal is eliminated in measuring the several potentials across RA and its associated central terminal G1, across LA and its associated central terminal G2, and across LL and its associated central terminal G3. The measuring of augmented extremity potentials between a central terminal and RA, LA, and LL, respectively, and eliminating the effect of the resistance between the particular extremity and the central terminal in taking each measurement is known practice in cardiology but heretofore, so far as I am aware, it was not possible to measure more than one potential at a time. The provision of the loop ARP and the switching connections heretofore described enable the simultaneous measurement and recording of the three augmented extremity potentials.

At station 4, the precordial leads P1, P2 and P3 are connected to the channels A, B and C, respectively, by the movable contact members 12A—13A, 14A—15A, and 16A—17A together with the movable contact members 51, 52 and 53 which connect the RA, LA and LL terminals through the resistances P1R, P2R and P3R, respectively to the stationary contacts RAR, LAR, and LLR which are companionate with the stationary contacts P1, P2 and P3, respectively at station 4. The stationary contacts which are engaged by movable contacts 51, 52 and 53 at this station are indicated at 51b, 52b and 53b as terminals of the resistances P1R, P2R, and P3R, respectively. The function of these resistances is well known in cardiology but it will be noted that their arrangement and the switch-contact arrangement enables the simultaneous connection of the three precordial leads to the three channels for simultaneous recording of the potentials in accordance with the present invention. At station 5, the movable contacts 12a—13a, 14a—15a, and 16a—17a connect the LA—LL, the RA—P1, and the P2—P3 terminals to the channels A, B, and C respectively, for simultaneous recording of the corresponding potentials by the marking elements MA, MB and MC in the same time relation on the recording sheet or web.

It will be noted that at each of the stations there is a stationary contact member which is engaged by the movable contact member 54 so as to energize the circuit of the time delay relay 46 and relay winding 42 for closing the circuits of the driving coils DCA, DCB and DCC as hereinbefore explained with reference to Fig. 1.

Further, it will be observed that in moving from one station to another, all of the movable contact members of switch 10 have intermediate disengaged or off positions, respectively, so that the switch may be opened at all of its contacts without requiring movement of the movable switch contacts to one particular off or switch-open station or position. The off positions of the movable contact members are all indicated by the same reference numeral 66.

As hereinbefore explained each of the channels A, B and C (Fig. 1) comprises electronic amplifier means to which the several conductors 18—19, 20—21, and 22—23 from the selector switch are connected. As all of the channels and their amplifiers are alike a description of one, channel A being arbitrarily selected for this purpose, will suffice. Referring now to the channel circuit shown in Fig. 3, it will be noted that the conductors 18—19 are connected to the input of the voltage amplifier through the blocking condensers 67 and 68 by reversing switches 69 and 70. Condensers 67 and 68 block direct current which might otherwise flow from the subject to the amplifier. Condensers 71 and 72 are provided to bypass radio frequencies which might be present in the region of the apparatus.

Provision is made to enable the same lead to be connected to a plurality of channels without affecting amplitude or causing interaction. This is accomplished by providing means for preventing loading of one channel to the detriment of another channel to which the same lead is connected. For this purpose there is provided a high impedance comprising the resistances 73 and 74 which, for example but without limitation, are each of the order of 4.7 megohms.

Figure 3:
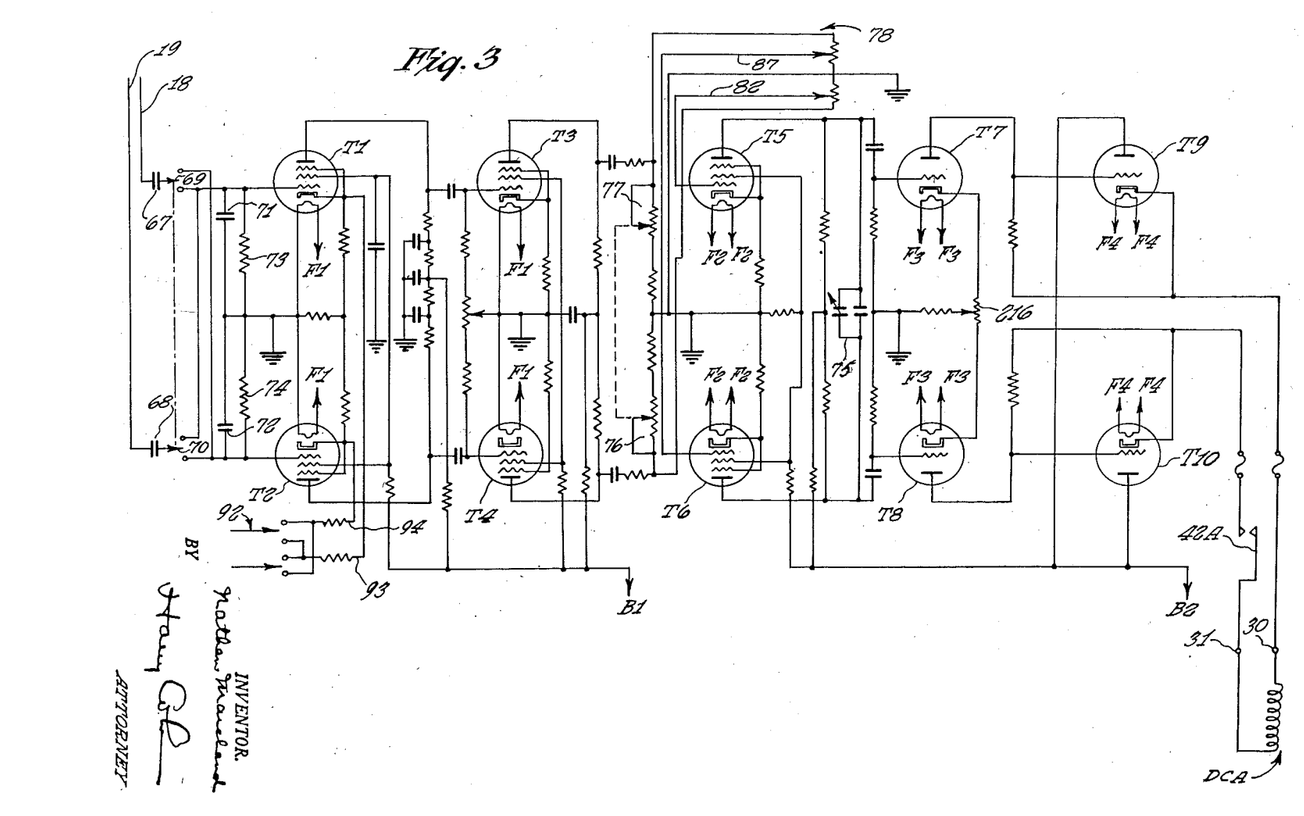
Fig. 3 is a circuit diagram of one of the channels and is illustrative of each of the other channels.

As shown in Fig. 3, the amplifying means comprises a resistance-capacity coupled voltage amplifier, which includes the tubes T1—T2, the tubes T3—T4, and the tubes T5—T6 and a power amplifier which includes the tubes T7—T8 and the tubes T9—T10. In this respect, the amplifier circuit is of the type described and claimed in the application of Joseph Lukacs, Ser. No. 725,026, filed January 29, 1947, and assigned to the assignee of the present application. It will be understood that the voltage amplifier provides sufficient amplification to drive the power amplifier for full excursion of the companion marking element or pen MA, MB, or MC as the case may be. It is to be noted that the amplifying means may be of any other suitable type and that the present invention is not to be limited to the use of an amplifier of the type disclosed in said Lukacs application.

In accordance with the present invention, the voltage amplifier is compensated for the mechanical properties of the pen and its mechanism which includes the companion driving coil and the means, hereinafter described, for operatively connecting the driving coil to its pen for actuating the latter. This compensation is accomplished by the damping control means which is preferably a capacitor 75 across the input to the power amplifier. As indicated capacitor 75 is preferably variable. It will be understood that the voltage and power amplifier thus provided with the damping control consequently has a gain which decreases at the frequencies at which the pen system has a high sensitivity and increases at the frequencies at which the pen system has a low sensitivity, whereby the pen or marking element of said system has a uniform excursion for the same voltage-magnitude input to the amplifier at any frequency within a range of frequencies, namely a substantially straight-line voltage-response at any frequency within a range for which the apparatus is adapted to be used. Also, as a result, over-excursion of the pen or marking element is prevented.

As shown in Fig. 3, each channel has its individual gain control means, which includes the adjustable resistances 76 and 77, so that the gain is set individually for each channel. The sensitivity controls for channels A, B and C are indicated in Fig. 1 at 78, 79, and 80, respectively, and said sensitivity control 78 is also shown in Fig. 3. It will be understood that sensitivity controls 79 and 80 for channels B and C are connected in their respective amplifier circuits in the same way as control 78. As indicated in Fig. 1, the movable resistance-adjusting members 81—82, 83—84, and 85—86 of sensitivity controls 78, 79 and 80, respectively, are all connected or ganged for movement in unison by a uni-control device diagrammatically indicated by the dot and dash lines designated 87, 88, 89 and 90.

As shown in Fig. 1, the time delay switch 46 comprises a bimetallic strip 46A which is heated by the heater 46B when switches 49, 50 are closed and when the movable contact 54 of switch 10 is connected to any one of the stationary contacts 55, 56, 57, 58 and 59 of switch 10, power supply switch S being closed. When said thermostatic strip 46A is heated sufficiently it closes the circuit through winding 42 at contact 47, whereupon armature 43A is attracted and opens the heater circuit at contact 43 and closes the circuit, at contact 43b, through winding 42, simultaneously short-circuiting the heater 46b. The switch operating rod 44 is connected to armature 43 so that when the latter is attracted, switches 42A, 42B and 42C are closed and remain closed until the winding 42 is de-energized by the opening of the switches 49 or 50 or by movement of contact member 54 of the selector switch to an off position.

The standardization voltage circuit 30 (Fig. 1) is connected as shown in Fig. 3 through the reversing switch 92 to the leads 93 and 94 of the cathodes of tubes T1 and T2 of the voltage amplifier. The pulse wheel 40 of said circuit may be omitted and switch 38 may be closed manually for any desired period of time.

Figures 4, 9, 10:
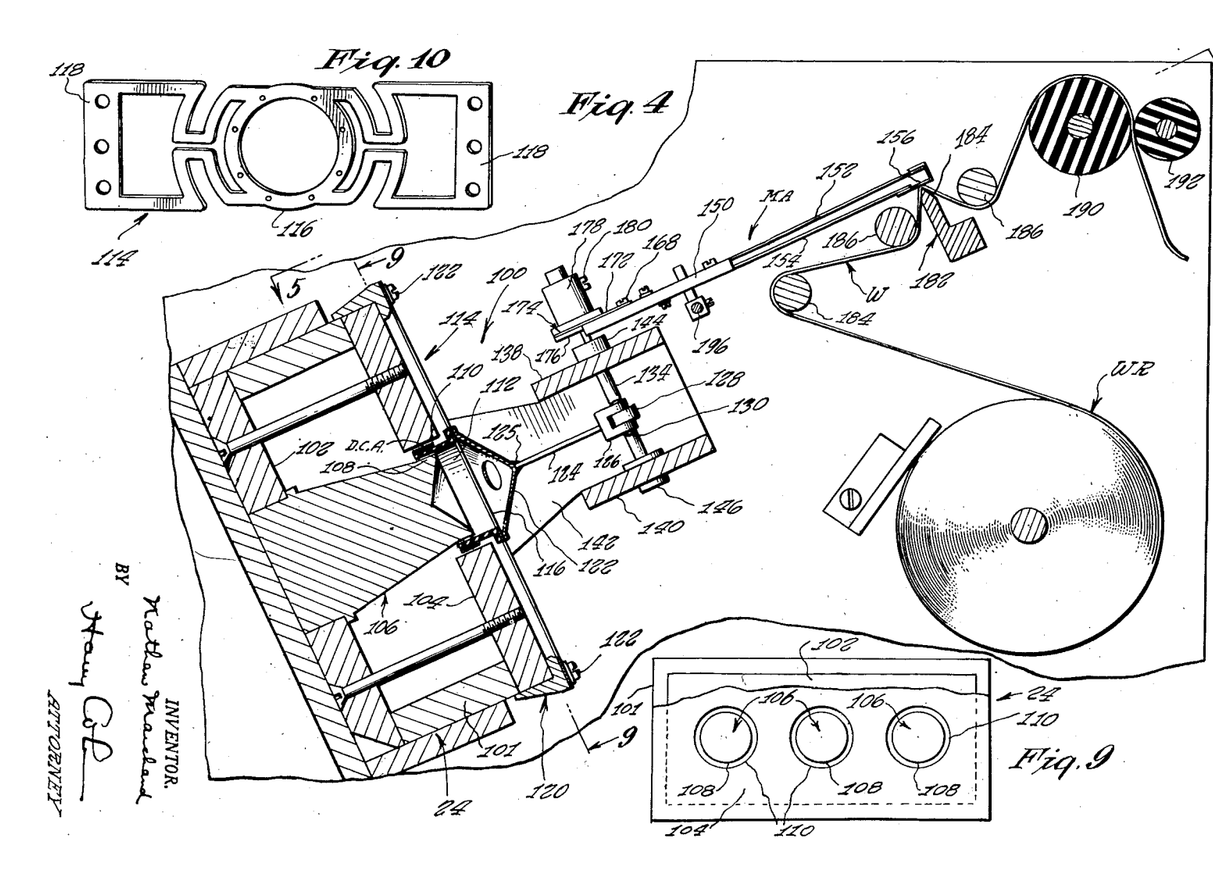
Fig. 4 is a sectional view of the recorder unit.
Fig. 9 is a view of the magnet structure of the electromotive device for operating the pens, on the line 9—9 of Fig. 4, the driving coils not being shown and a part of the magnet structure being cut away for the purpose of illustration.
Fig. 10 is a side view of one of the spring diaphragms of the pen-operating mechanism.

Referring now to the recorder unit illustrated more or less in detail in Figs. 4 to 10, said recorder comprises a magneto-motive device 100 which includes the permanent magnet 24 and the driving coils DCA, DCB and DCC for the pens or marking elements MA, MB and MC, respectively. This permanent magnet 24 shown in Fig. 1 as in three separate elements 24A, 24B and 24C, comprises the one-piece rectangular member 101 (Figs. 4 and 9) which is a strong permanent magnet, the soft iron plates 102 and 104, and the cores 106 which are fixed in plate 102 and have their free end portions positioned in the companion circular openings 110, respectively, of plate 104, in which the driving coils are mounted for axial movement as shown in Fig. 4. It will be noted that the single magnetic structure for the several driving coils assures uniform magnetic flux for said coils, thus obviating the necessity for matching magnets if separate magnets, one for each coil, were provided. The winding of each driving coil is mounted, on a light-weight sleeve 112 of insulation material, the latter and the winding carried thereby being axially movable as a unit, rectilinearly, in the annular air gap defined by the peripheral end portion 108 of core 106 and the peripheral edge of plate 104 which defines the companion opening 110. Each sleeve 112 is fastened to a companion diaphragm 114 of resilient sheet material. Said diaphragm is formed in one piece and comprises the central part 116, to which sleeve 112 is fastened, and the opposite end portions 118 which are secured and clamped to mounting member 120 in any suitable way as by machine screws 122. Said mounting member 120 is fixed to the magnet structure 24 in any suitable way, and it will be understood that the latter is carried by a stationary frame forming a part of the electrocardiograph. It will be readily understood that diaphragm 114 resiliently opposes movement of the companion driving coil in either direction axially of said coil in the companion air gap of the magnet structure.

The marking elements or pens MA, MB, and MC are operatively connected to their driving coils, respectively, by the mechanisms which will now be described. As all of these mechanisms are alike, a description of one for which purpose the mechanism of element MA is arbitrarily selected, will suffice for all. The mechanism comprises a cone 122 of light sheet metal, such as copper, having its base fastened to the central part 116 of the companion diaphragm 114. A stem or rod 124 is fastened at one end 125 to said cone at its apex and is pivotally connected at its opposite forked end 126 to a crank arm 128 by means of a pivot pin 130. Crank arm 128 is part of a sleeve 132 which is secured to a shaft or spindle 134 in any suitable way, as by a set screw 136, so that said sleeve is adjustable longitudinally of said spindle.

The spindles 134 are mounted for turning movement in a stationary support comprising the upper and lower plates 138 and 140, respectively, fixed to and carried by the bracket arms 142, the latter being fixed and projecting from the magnetic structure 24. Said plates 138 and 140 are provided with anti-friction bearings 144 and 146, respectively, for each spindle. The reduced upper end part 148 (Fig. 8) of spindle 134 projects upwardly beyond upper plate 138 for connection to the companion marking element. It will be noted that the spindles 134 for the three marking elements or pens MA, MB and MC are disposed in laterally spaced relation and that the marking elements, being secured to said spindles, are similarly disposed in laterally spaced relation.

All of the marking elements are alike and each comprises an insulation strip or support 150 for companion metal conductor strips 152 and 154 which are secured to strip 150 at the opposite sides of the latter which spaces and insulates said strips from each other. The outer ends of strips 152 and 154 are electrically connected to each other by the resistance strip 156 which constitutes the heating member which acts on the recording material. Terminals 158 and 160, including binding screws, are provided at the inner ends of conductor strips 152 and 154, respectively, for connection to a source of current for heating resistance member 156. The screws 162 which secure strip 152 to insulation strip 150 are insulated from strip 154 and the screws 164 which similarly secure strip 154 to said insulation strip are insulated from strip 152.

Figure 5:
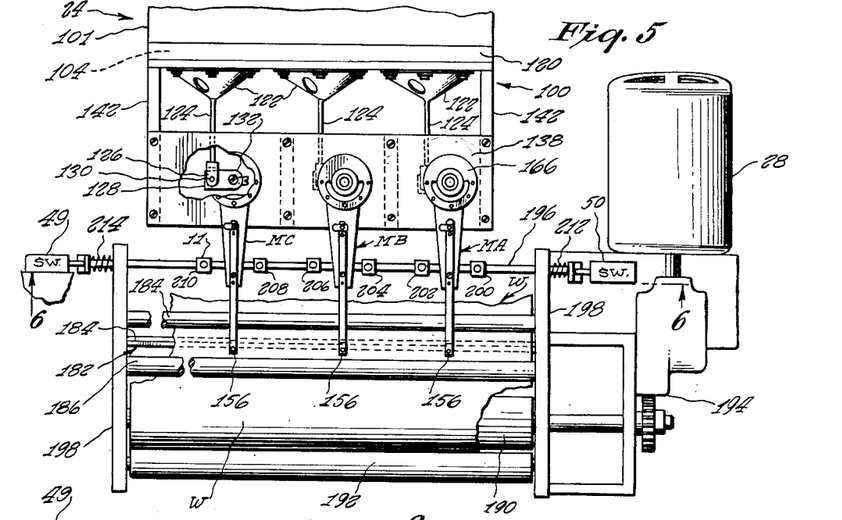
Fig. 5 is a top view, on a smaller scale, of the recorder unit, as observed from the line 5—5 of Fig. 4.
Figure 6:
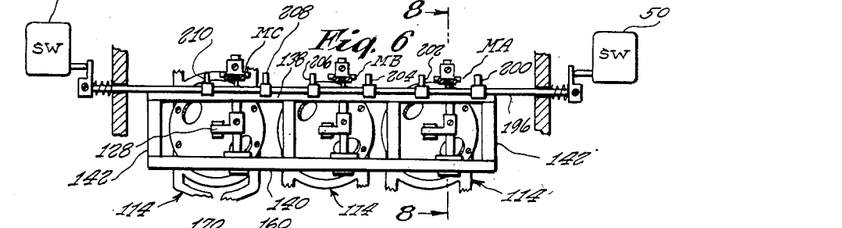
Fig. 6 is a view on the line 6—6 of Fig. 5.
Figure 7:
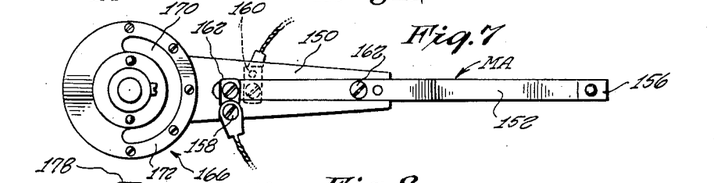
Fig. 7 is a top view of one of the pens or marking elements.
Figure 8:
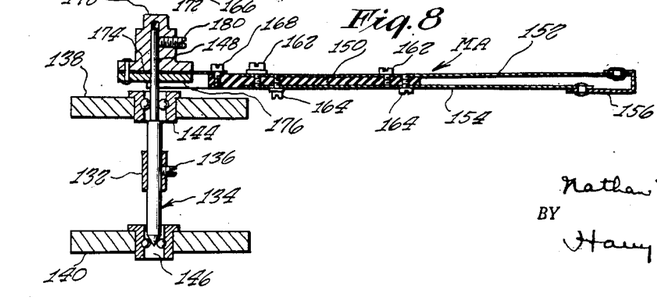
Fig. 8 is a sectional view on the line 8—8 of Fig. 6.

As shown in Figs. 4 and 5, the heating members 156 of the several marking elements act on the same web W of recording material so as to produce directly the visual records of the body voltage variations or potentials transmitted by the selected three leads to the three channels. In order to adjust the several marking elements for uniform action on said web of recording material, provision is made for adjusting the pressure of the heating members, individually, on the web. For this purpose a flat disk 166 of spring metal is secured to the inner end of insulation strip 150 by means of screws 168. Said disk has an arcuate slot 170 forming an outer portion 172 which is free to flex in relation to the rest of the disk, and it will be noted that this portion 172 is connected to strip 150 of the marking element. As shown in Fig. 8, part 174 of the disk 166 inwardly of slot 170 is clamped between the members 176 and 178 which are secured to each other in disk clamping relation and which are mounted on the spindle 134. Member 176 is in the form of cap and and has a central bore in which the reduced upper end 148 of spindle 134 is received. Member 178 is adjustably secured to end portion 148 of the spindle by a set screw 180. It will be understood that by adjusting member 178 longitudinally of the spindle, the spring pressure of flexible part 172 of the disk on the companion element is thereby adjusted whereby to regulate the pressure of the marking element, specifically the heating part 156 thereof, on the recording web W.

Preferably, the marking elements MA, MB and MC are matched, being of the same size, shape and weight. Similarly, the driving coils and the means which are operated by said coils and which actuate said marking elements are preferably matched in size and weight as well as in mechanical construction.

It will be noted that the marking elements engage the recording material along a very narrow or line-like portion of the web, thus making certain that all of the marking elements act simultaneously on the recording material at points which are in true alignment laterally of the web, i. e., along a line at right angles to the direction of travel of the web, which moves in the direction of its length. This greatly facilitates the recording of several cardiograms simultaneously and in the same time co-ordinate. In order to present a very narrow or line-like portion of the web to the plurality of marking elements simultaneously, the web is caused to move over a support 182 which has a sharp edge 184 and the web is directed in its travel over said edge so as to form a fold line at said edge extending longitudinally thereof and transversely of the web. For this purpose the web is caused to move from the supply roll WR in engagement with the guide bars 184, 186 and 188 past which the web is drawn by the driven roller 190 and the companion spring-pressed pressure roller 192. The roller 190 is rotated at uniform speed, at the desired rate of paper feed, by the motor 28, suitable speed reduction gearing being provided as indicated more or less diagrammatically in Fig. 5 at 194.

The mechanism hereinbefore referred to for opening switches 49 and 50 in the event of overexcursion of the marking elements or pens, whereby to disconnect the driving coils by opening switches 42A, 42B and 42C (Fig. 1), comprises a rod 196 mounted for longitudinal movement in the spaced frame members 198. Pairs of stop members 200—202, 204—206, and 208—210 are secured to rod 196 in the path of movement or excursion of the marking elements MA, MB and MC, respectively. The stop members of each pair are laterally spaced from each other so as not to impede the normal lateral or oscillatory movements or excursions of said marking elements, but in the event of excess movement of any one of said marking elements, in either direction, that marking element engages one of the stop members and thereby moves rod 196 against the force of spring 212 or 214, as the case may be, and opens switch 49 or switch 50 depending upon the direction of over-excursion of the particular marking element. When the driving coils are de-energized, the marking elements are returned to their central positions by their respective diaphragms 114, and rod 196 is at the same time returned to its normal position whereupon switches 49 and 50 close automatically so that winding 42 can be re-energized as soon as the automatic time delay switch 46 closes, provided that the selector switch 10 is closed across terminals 48. As shown in Fig. 3, the power amplifier of each channel includes an adjustable resistance 216 for centering the pen which is operated by the companion driving coil. By adjustment of the movable contact of said resistance, the position of the driving coil within its unidirectional field in the companion air gap of the magnet may be controlled.

The recorder unit per se is not my invention and is therefore not claimed herein per se, but said unit is claimed in the application of George Gorham, Ser. No. 762,613, filed concurrently herewith.

It will be understood that the invention may be embodied otherwise than as hereinbefore described and that various changes may be made without departing from the underlying idea or principles of the invention within the scope of the appended claims.

Having thus described my invention, what I claim and desire to secure by Letters Patent, is:

1. For use in an electro-cardiograph, a plurality of channels each including electronic amplifier means for amplifying body-voltage variations, means for simultaneously connecting a plurality of pairs of leads for voltages across different pairs, respectively, of parts of the subject's body to different ones of said channels, respectively, for amplification of said voltages simultaneously by said amplifying means of said channels, respectively, means for moving a length of recording material in the direction of its length, a plurality of marking elements, one for each of said channels, for making individual records, one for each pair of leads, directly on said material during said movement of the latter, said marking elements being arranged in spaced relation laterally of the recording material and engageable with the latter at points which are spaced from each other laterally of said recording material but in the same positions longitudinally of said material, and a plurality of means operatively connected to said channels, respectively, and operable in accordance with the voltages amplified by said amplifying means of said channels, respectively, for operating said marking elements, respectively, individually and in the same time relation, whereby the records made by said elements on said recording material are all in the same time relation.

2. For use in an electro-cardiograph, a plurality of channels, each including electronic amplifier means for amplifying body-voltage variations, means for connecting a plurality of pairs of leads for voltages from across different pairs, respectively, of different parts of the subject's body, to said amplifying means of said channels, respectively, there being at least two pairs of leads which includes a common lead connected to the same part of the subject's body and simultaneously to a plurality of said channels, and means for recording said body-voltages which are applied to said channels, respectively, said recording means comprising means for moving a length of recording material of the direct-reading type in the direction of its length, a plurality of separate individually movable marking elements operable simultaneously on said recording material during said movement of the latter for directly recording said voltages visually thereon, said marking elements being arranged in spaced relation laterally of the recording material and engageable with the latter at points which are spaced from each other laterally of said recording material but in the same positions longitudinally of said material, electro-magnetic means including a plurality of individually movable driving coils connected individually to said channels, respectively, for energization in accordance with the body-voltages supplied to the respective channels and amplified by said amplifying means, respectively, and means operatively connecting said driving coils individually to said movable elements, respectively, for actuating the latter.

3. For use in an electro-cardiograph, a plurality of channels, each including electronic amplifier means for amplifying body-voltage variations, means for connecting a plurality of pairs of leads for voltages from across different pairs, respectively, of different parts of the subject's body, to the inputs of said amplifying means of said channels, respectively, there being at least two pairs of leads which includes a common lead connected to the same part of the subject's body and simultaneously to a plurality of said channels, and means including a high impedance between said leads and the inputs to said amplifying means of said channels for preventing interaction between the channels to which the same lead is connected.

4. For use in an electro-cardiograph, a plurality of channels, each including electronic amplifier means for amplifying body-voltage variations, means for connecting a plurality of pairs of leads for voltages from across different pairs, respectively, of different parts of the subject's body, to the inputs of said amplifying means of said channels, respectively, there being at least two pairs of leads which includes a common lead connected to the same part of the subject's body and simultaneously to a plurality of said channels, and means in circuit between said leads and the inputs to said amplifying means for preventing interaction between the channels to which the same lead is connected.

5. For use in an electro-cardiograph, a plurality of channels, each including electronic amplifier means for amplifying body-voltage variations, means for connecting a plurality of pairs of leads for voltages from across different pairs, respectively, of different parts of the subject's body, to said amplifying means of said channels, respectively, there being at least two pairs of leads which includes a common lead connected to the same part of the subject's body and simultaneously to a plurality of said channels, means in circuit between said leads and the inputs to said amplifying means for preventing interaction between the channels to which the same lead is connected, a plurality of movable driving coils operatively connected to said channels, respectively, for energization individually but simultaneously in accordance with said voltage variations amplified by said amplifier means of said channels, respectively, and means including a plurality of individual mechanisms actuated simultaneously for making individual records of said of the body-voltages which are applied to said channels, respectively.

6. In an electro-cardiograph, a recorder comprising means for moving a length of recording material in the direction of its length, a plurality of marking elements disposed in laterally spaced relation and operable in the same time relation for recording a plurality of varying potentials directly on said recording material, said marking elements being arranged in spaced relation laterally of the recording material and engageable with the latter at points which are spaced from each other laterally of said recording material but in the same positions longitudinally of said material, magneto-motive means including mechanisms comprising driving coils and means operated thereby for operating said marking elements, respectively, a plurality of amplifier channels connected to said driving coils, respectively, and means for transmitting body potentials simultaneously to the inputs, respectively, of said amplifier channels, said latter means comprising means for connecting a plurality of pairs of leads for potentials across different pairs, respectively, of different parts of the subject's body to said amplifier channels, respectively.

7. For use in an electro-cardiograph, a recorder comprising means for moving a length of recording material in the direction of its length, a plurality of marking elements disposed in laterally spaced relation for recording a plurality of varying potentials on said recording material, magneto-motive means including mechanisms comprising driving coils and means operated thereby for operating said marking elements, respectively, a plurality of amplifier channels, each of said channels comprising a voltage amplifier and a power amplifier, means connecting said driving coils to said power amplifiers, respectively, means for transmitting body potentials to the inputs of said voltage amplifiers, respectively, and damping control means in each of said amplifier channels which regulate the gain of the amplifier so that it decreases at the frequencies at which said mechanism has a high sensitivity and increases at the frequencies at which said mechanism has a low sensitivity whereby said marking element has a uniform excursion for the same voltage-magnitude input to the amplifier at any frequency within a range of frequencies and whereby over-excursion of the marking element is prevented.

8. For use in an electro-cardiograph, a recorder having mechanism comprising a driving coil, a marking element, and means operatively connecting said coil to said element for actuating the same, the combination with said coil mechanism and marking element of a voltage and power amplifier for energizing said coil, said amplifier having damping control means for adjusting its frequency response so that the gain of said amplifier decreases at the frequencies at which said mechanism has a high sensitivity and increases at the frequencies at which said mechanism has a low sensitivity whereby said marking element has a uniform excursion for the same voltage-magnitude input to the amplifier at any frequency within a range of frequencies and whereby over-excursion of the marking element is prevented.

9. For use in an electro-cardiograph having a recorder comprising means for moving a length of recording material in the direction of its length and a marking element mechanism including a movable driving coil, a marking element, and means operatively connecting said coil to said marking element for actuating the latter, the combination with said mechanism of an amplifier including voltage-amplifying means for amplifying body potentials and power-amplifying means driven by said voltage amplifying means and connected to said driving coil for energizing the latter, and a damping control capacitor connected across the input of said power amplifying means whereby the amplifier has a frequency response such that the gain of said amplifier decreases at the frequencies at which said mechanism has a high sensitivity and increases at the frequencies at which said mechanism has a low sensitivity whereby said marking element has a uniform excursion for the same voltage-magnitude input to the amplifier at any frequency within the range of frequencies and whereby over-excursion of the marking element is prevented.

10. For use in an electro-cardiograph, a recorder comprising means for moving a length of recording material in the direction of its length, a plurality of marking elements disposed in laterally spaced relation for recording a plurality of varying potentials directly on said recording material, said marking elements being arranged in spaced relation laterally of the recording material and engageable with the latter at points which are spaced from each other laterally of said recording material but in the same positions longitudinally of said material, magneto-motive means including mechanisms comprising driving coils and means operated thereby for operating said marking elements, respectively, a plurality of amplifier channels, and a multi-pole selector switch for simultaneously connecting a plurality of pairs of selected leads to said channels, respectively, for simultaneously transmitting to the latter a plurality of body potentials for the recording thereof by said mechanisms, respectively.

11. For use in an electro-cardiograph, a recorder comprising means for moving a length of recording material in the direction of its length, a plurality of marking elements disposed in laterally spaced relation for recording a plurality of varying potentials on said recording material, magneto-motive means including mechanisms comprising driving coils and means operated thereby for operating said marking elements, respectively, a plurality of amplifier channels, and a multi-pole selector switch for simultaneously connecting a plurality of pairs of selected leads to said channels, respectively, for simultaneously transmitting to the latter a plurality of body potentials for the recording thereof by said mechanisms, respectively, there being at least two pairs of leads which includes a common lead connected to the same part of the subject's body and simultaneously to a plurality of said channels, and means connected between said leads and the inputs to said amplifier channels for preventing interaction between the channels to which the same lead is connected.

12. For use in an electro-cardiograph, a recorder comprising means for moving a length of recording material in the direction of its length, a plurality of marking elements disposed in laterally spaced relation for recording a plurality of varying potentials directly on said recording material, said marking elements being arranged in spaced relation laterally of the recording material and engageable with the latter at points which are spaced from each other laterally of said recording material but in the same positions longitudinally of said material, magneto-motive means including mechanisms comprising driving coils and means operated thereby for operating said marking elements, respectively, a plurality of amplifier channels, means for connecting said amplifier channels, individually, to said driving coils, and switching means having a plurality of on and off positions for selectively and simultaneously connecting a selected combination of plurality of different pairs of leads for different body potentials to the input of said amplifier channels, there being an off position intermediate each pair of on positions, respectively.

13. In an electro-cardiograph, a recorder comprising means for moving a length of recording material in the direction of its length, a plurality of marking elements disposed in laterally spaced relation for recording a plurality of varying potentials on said recording material, magneto-motive means including mechanisms comprising driving coils and means operated thereby for operating said marking elements, respectively, a plurality of amplifier channels, switching means for connecting said amplifier channels, individually, to said driving coils, and switching means having a plurality of on and off positions for selectively connecting a selected combination of plurality of different pairs of leads for different body potentials to the inputs of said amplifiers, and means operably under the control of said last mentioned switching means for actuating said first mentioned switching means to disconnect said driving coils from their respective channels when said last mentioned switching means is in any one of a plurality of its off positions.

14. In an electro-cardiograph, a recorder comprising means for moving a length of recording material in the direction of its length, a plurality of marking elements disposed in laterally spaced relation for recording a plurality of varying potentials on said recording material, magneto-motive means including mechanisms comprising driving coils and means operated thereby for operating said marking elements, respectively, a plurality of amplifier channels, switching means for connecting said amplifier channels, individually, to said driving coils, and switching means having a plurality of on and off positions for selectively connecting a selected combination of plurality of different pairs of leads for different body potentials to the inputs of said amplifiers, and means operably under the control of said last mentioned switching means for actuating said first mentioned switching means to disconnect said driving coils from their respective channels when said last mentioned switching means is in any one of a plurality of its off positions, and means for delaying the connection of said driving coils to their respective channels when said last mentioned switching means is moved from an off position to an on position.

15. In an electro-cardiograph, a plurality of channels for different body potentials, means for connecting a plurality of pairs of leads for potentials across different pairs, respectively, of different parts of the subject's body to said channels, respectively, each of said channels including an electronic amplifying system, and recording means of the direct-reading type provided with a plurality of marking elements operable individually and in the same time relation and actuating means therefor, respectively, said marking elements being arranged in spaced relation laterally of the recording material and engageable with the latter at points which are spaced from each other laterally of said recording material but in the same positions longitudinally of said material, said actuating means including a plurality of electrically operated driving means, one for each marking element, connected to said amplifying systems of said channels, respectively, whereby the body potentials which are supplied to said channels, respectively, are amplified by said amplifying systems, respectively, and recorded by said recording means in the form of individual graphs, all in the same time relation.

16. In an electro-cardiograph, a plurality of channels for different body potentials, each of said channels including an electronic amplifying system, and recording means of the direct-reading type provided with a plurality of individually operable marking elements and actuating means therefor, respectively, said actuating means including a plurality of electrically operated driving means, one for each marking element, connected to said amplifying systems of said channels, respectively, whereby the body potentials which are supplied to said channels, respectively, are amplified by said amplifying systems, respectively, and recorded by said recording means in the form of individual graphs, and means operable under the control of any one of said marking elements for disconnecting all of said electrically operated driving means from said amplifying systems, respectively, in the event of over-excursion of said one of said marking elements in either direction.

17. In an electro-cardiograph, a plurality of channels for different body potentials, each of said channels including an electronic amplifying system, and recording means of the direct-reading type provided with a plurality of individually operable marking elements and actuating means therefor, respectively, said actuating means including a plurality of electrically operated driving means, one for each marking element, connected to said amplifying systems of said channels, respectively, whereby the body potentials which are supplied to said channels, respectively, are amplified by said amplifying system, respectively, and recorded by said recording means in the form of individual graphs, and means operable under the control of any one of said marking elements for disconnecting all of said electrically operated driving means from said amplifying systems, respectively, in the event of over-excursion of said one of said marking elements in either direction, and means including a time-delay device for re-connecting said driving means to said amplifying systems following the disconnection caused by such over-excursion of a marking element.

18. In an electro-cardiograph, a plurality of channels, means for connecting a plurality of pairs of leads for potentials across different pairs, respectively, of different parts of the subject's body to said channels, respectively, each of said channels including electronic amplifying means for body potentials transmitted to the inputs of said channels, respectively, individual manual gain-control means for said amplifying means, respectively, separately adjustable to set the gains of said amplifying means individually, individual circuits each including said individually adjustable means, and additional means in said circuits, respectively, manually variable in unison for controlling the sensitivity of all of said amplifying means simultaneously.

19. For use in an electro-cardiograph, a plurality of channels for different body potentials, each of said channels including an electronic amplifying system, and recording means of the direct-reading type provided with a plurality of marking elements operable individually and in the same time relation and actuating means therefor, respectively, said actuating means including a plurality of electrically operated driving means, one for each marking element, connected to said amplifying systems of said channels, respectively, whereby the body potentials which are supplied to said channels, respectively, are amplified by said amplifying systems, respectively, and recorded by said recording means in the form of individual graphs, all in the same time relation, and means in circuit with said channels for supplying standardization voltage pulses thereto, said pulses being amplified by said amplifying systems, respectively, and recorded by said recording means whereby the recordings of said voltages are superimposed on the individual graphs of said body potentials.

20. For use in an electro-cardiograph, a plurality of channels for different body potentials, each of said channels including an electronic amplifying system, and recording means of the direct-reading type provided with a plurality of marking elements operable individually and in the same time relation and actuating means therefor, respectively, said actuating means including a plurality of electrically operated driving means, one for each marking element, connected to said amplifying systems of said channels, respectively, whereby the body potentials which are supplied to said channels, respectively, are amplified by said amplifying systems, respectively, and recorded by said recording means in the form of individual graphs, all in the same time relation, and means in circuit with said channels for supplying standardization voltage pulses thereto, said voltage pulses being amplified by said amplifying systems, respectively, and recorded by said recording means whereby the recordings of said voltages are superimposed on the individual graphs of said body potentials, said standardization voltage means including a voltage supply and pulse-switch means in circuit between said voltage supply and said channels.

21. In an electro-cardiograph having a recorder comprising means for moving a length of recording material in the direction of its length and a marking element mechanism including a movable driving coil, a marking element, and means operatively connecting said coil to said marking element for actuating the latter, the combination with said mechanism of an amplifier including voltage-amplifying means for amplifying body potentials and power-amplifying means driven by said voltage amplifying means and connected to said driving coil for energizing the latter, and a damping control capacitor connected across the input of said power amplifying means whereby the amplifier has a frequency response such that the gain of said amplifier decreases at the frequencies at which said mechanism has a high sensitivity and increases at the frequencies at which said mechanism has a low sensitivity whereby said marking element has a uniform excursion for the same voltage-magnitude input to the amplifier at any frequency within a range of frequencies and whereby over-excursion of the marking element is prevented, said damping control capacitor being variable for separately adjusting the frequency response of each of said amplifiers, respectively.

22. In an electro-cardiograph, a recorder comprising means for moving a length of recording material in the direction of its length, a plurality of marking elements disposed in laterally spaced relation for recording a plurality of varying potentials on said recording material, magnetomotive means including mechanisms comprising driving coils and means operated thereby for operating said marking elements, respectively, a plurality of amplifier channels, switching means for connecting said amplifier channels, individually, to said driving coils, and switching means having a plurality of on and off positions for selectively connecting a selected combination of plurality of different pairs of leads for different body potentials to the inputs of said amplifiers, and means including a relay operably under the control of said last mentioned switching means for actuating said first mentioned switching means to disconnect said driving coils from their respective channels when said last mentioned switching means is in any of one of a plurality of its off positions, and a time-delay device in circuit with said relay for delaying the connection of said driving coils to their respective channels when said last mentioned switching means is moved from an off position to an on position.

23. In an electro-cardiograph, a plurality of channels for different body potentials, each of said channels including an electronic amplifying system, and recording means of the direct-reading type provided with a plurality of individually operable marking elements and actuating means therefor, respectively, said actuating means including a plurality of electrically operated driving means, one for each marking element, connected to said amplifying systems of said channels, respectively, whereby the body potentials which are supplied to said channels, respectively, are amplified by said amplifying systems, respectively, and recorded by said recording means in the form of individual graphs, and means including a relay operable under the control of any one of said marking elements for disconnecting all of said electrically operated driving means from said amplifying systems, respectively, in the event of over-excursion of said one of said marking elements in either direction, and means including a time-delay device in circuit with said relay for re-connecting said driving means to said amplifying systems following the disconnection caused by such over-excursion of a marking element.

24. In an electro-cardiograph, a plurality of channels each including electronic amplifying means for body potentials transmitted to the inputs of said channels, respectively, individual manual gain-control means for said amplifying means, respectively, separately adjustable to set the gains of said amplifying means individually, individual circuits each including said individually adjustable means, and additional means in said circuits, respectively, manually variable in unison for controlling the sensitivity of all of said amplifying means simultaneously, said additional means including a continuously variable potentiometer in each of said circuits, the variable arm of each potentiometer being connected to the input of the amplifying means in its associated channel, respectively, the variable arms of all of said potentiometers being variable in unison, and said individual gain control means comprising a rheostat in shunt with each of said potentiometers.

25. In an electro-cardiograph, a plurality of channels, each including body-voltage amplifying means, a series of leads for augmented extremity potentials, each of said leads comprising a pair of conductors connected to the input of one of said channels, respectively, and a closed resistance loop, spaced fixed contact points on said loop, each of said points being connected to a different body extremity, respectively, one conductor of each of said pairs being connected to one of said fixed points, additional spaced fixed contact points on said loop, each of said additional points being intermediate a pair of said first mentioned points, the other conductor of each of said pairs being connected to one of said additional points between a pair of said first mentioned points to neither of which its companion conductor is connected.

26. In an electro-cardiograph, a series of leads for measuring augmented extremity potentials, each of said leads comprising a pair of companion conductors, one conductor of each pair being adapted for connection to a selected body extremity, a closed resistance loop, a first plurality of spaced points on said loop, each of said one conductors being connected to one of said points, respectively, and a second plurality of spaced points on said loop, each of said second points being located between a pair of said first points, the other conductor of each of said leads being connected to a second point which is between a pair of said first points neither of which is connected to its companion conductor, whereby when said one conductor of each lead is connected to a different body extremity, respectively, the effect of the resistance between each of said extremities and the second point of the companion conductor is eliminated in measuring the several potentials between each of said extremities and the second points of the companion conductors, respectively.

27. In an electro-cardiograph, at least three leads for measuring augmented extremity potentials, each of said leads comprising a pair of companion conductors, one conductor of each pair being adapted for connection to a selected body extremity, a closed resistance loop, at least three spaced points in said loop, each of said one conductors being connected to one of said points, respectively, and a second plurality of at least three spaced points on said loop, each of said second points being located between a pair of said first points to constitute a central terminal, the other conductor of each of said leads being connected to a central terminal which is between a pair of said first points neither of which is connected to its companion conductor, whereby when said one conductor of each lead is connected to a different body extremity, respectively, the effect of the resistance between each of said extremities and the central terminal of its associated lead is eliminated in measuring the several potentials between each of said extremities and the central terminals of the companion leads, respectively.

NATHAN MARCHAND.

REFERENCES CITED

The following references are of record in the file of this patent:

UNITED STATES PATENTS

| Number | Name | Date |
|---|---|---|
| 1,647,711 | Nichols | Nov. 1, 1927 |
| 1,888,139 | Nichols | Nov. 15, 1932 |
| 2,098,695 | Southwick | Nov. 9, 1937 |
| 2,113,825 | Caldwell | Apr. 12, 1938 |
| 2,150,223 | Hollmann | Mar. 14, 1939 |
| 2,276,423 | Silverman | Mar. 17, 1942 |
| 2,321,605 | Keinath | June 15, 1943 |
| 2,340,272 | McCarty | Jan. 25, 1944 |
| 2,348,409 | Parr | May 9, 1944 |
| 2,374,204 | Hoover, Jr. | Apr. 24, 1945 |
| 2,418,836 | Hawes | Apr. 15, 1947 |
| 2,419,682 | Guillemin, Jr. | Apr. 29, 1947 |
| 2,427,421 | Rieber | Sept. 16, 1947 |
| 2,430,246 | Piety | Nov. 4, 1947 |
| 2,435,753 | Richter et al. | Feb. 10, 1948 |
| 2,485,730 | Giffen et al. | Oct. 25, 1949 |
| 2,509,651 | Olson | May 30, 1950 |